March 21, 1967 P. NIEDERWEMMER 3,309,875
IRRIGATION INSTALLATION AND MOBILE VEHICLE
FOR PRODUCING THE SAME
Filed June 29, 1964 2 Sheets-Sheet 1
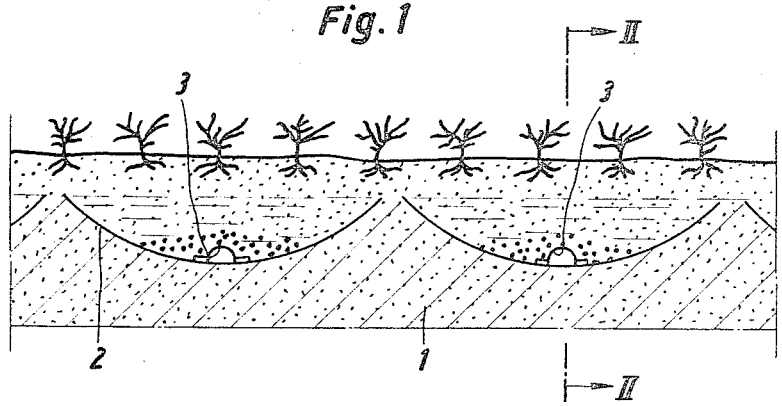
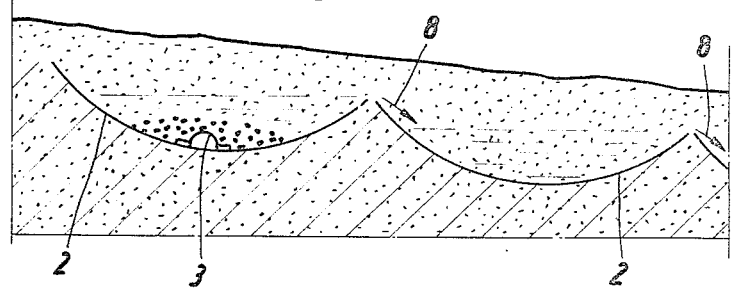
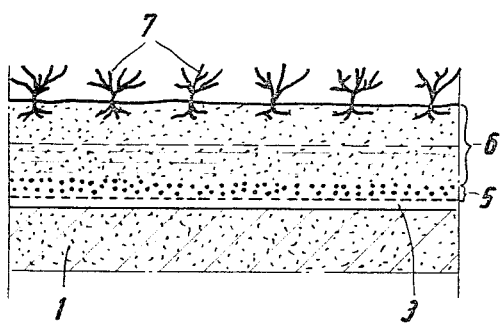
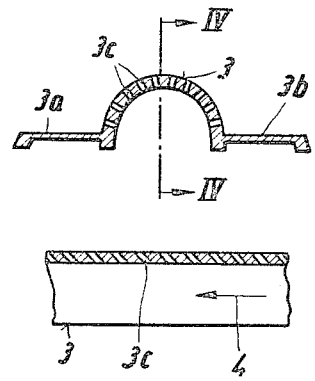

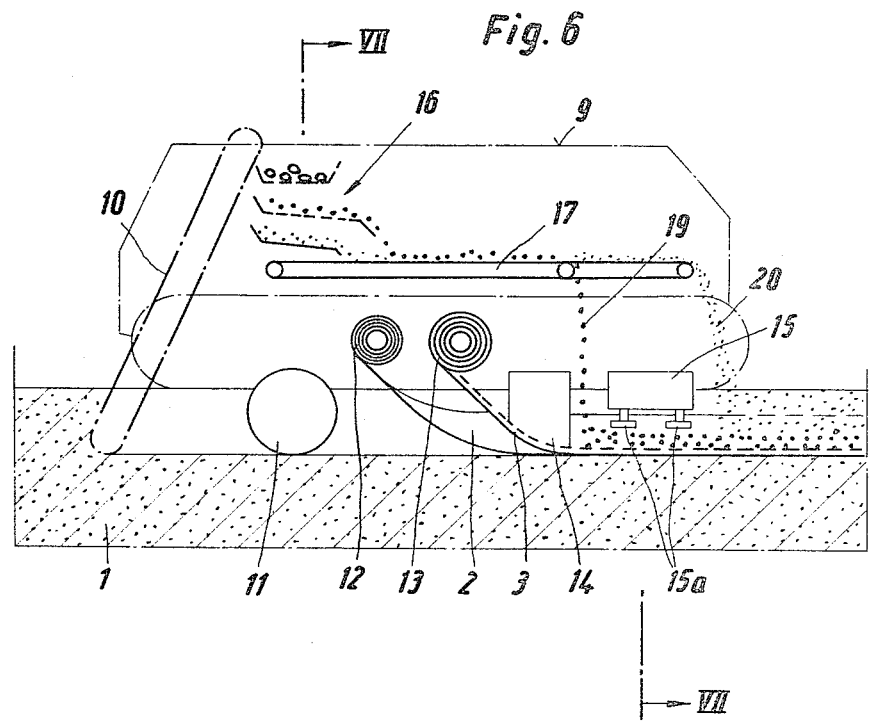
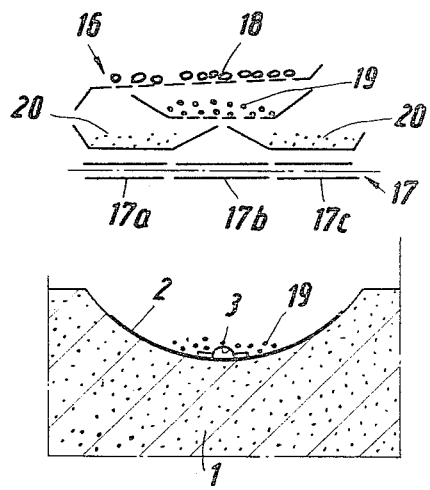

United States Patent Office 3,309,875
Patented Mar. 21, 1967

3,309,875
IRRIGATION INSTALLATION AND MOBILE
VEHICLE FOR PRODUCING THE SAME
Paul Niederwemmer, Im Birkenbusch, St. Mauritz 3,
Munster, Germany
Filed June 29, 1964, Ser. No. 378,727
Claims priority, application Germany, July 5, 1963,
N 23,425
6 Claims. (Cl. 61—13)

The invention relates to equipment for irrigating dry terrain by means of a drainage process using water supply pipes located under a layer of soil and equipped with perforations serving as water outlets.

It is known to irrigate dry areas in such a manner that an almost even area surrounded by low dams is formed, the surface of which is continuously covered with water. This irrigation method which is applicable only to a few cultivated plants, has the drawback that the necessary levelling of the ground, and the construction and maintenance of the dams is comparatively expensive.

It is also known to irrigate dry areas by means of sprinklers but this method is objectionable, especially in hot zones, in that a substantial part of the water evaporates before being absorbed by the plants.

In order to avoid these disadvantages, there have been constructed irrigation devices using the drainage method wherein water pipes are laid in the ground under a layer of soil and provided with holes serving as water outlets. In these devices, there is the problem of preventing the water issuing from the pipes from soaking into the ground.

The present invention has therefore the object of providing means for irrigating in dry areas by means of the drainage method, wherein the water supplied is substantially and effectively used and generally the invention is directed to the concept of arranging in the ground channel-shaped imperforate flexible plastic foils serving as water reservoirs, with the upper edge of the foils being located slightly below the maximum tilling depth, and positioning a water supply pipe of flexible perforated material in the lower zone of the foils.

More particularly, the water supply pipe is constituted by a substantially semi-cylindrical plastic member having two oppositely extending supporting surfaces which rest on the foil for supporting the pipe, the perforations in the pipe being inclined in the direction of the flow of the water therein so that any sand entering the pipe through the perforations will be carried along in the water flow thus preventing an accumulation of sludge and sand therein and the water pipe and at least the lower zone of the foil being covered with a filling material the granule or particle size of which is larger than the perforations in the pipe.

In the event sloping terrain is to be irrigated, the foils extending normally to the gradient are located along the slope in stepped relationship whereby water passes from a higher foil into the next lower one so that water supply pipes are not required for the lower foils.

The invention further is directed to a machine for making the irrigation installation which comprises, in sequence from the front towards the back of the vehicle, an excavating means for forming a channel, a roller corresponding to the desired profile of the channel, a take-off reel or drum provided with retaining and guide mechanisms for the plastic foil and the semi-cylindrical plastic water supply member, a set of screens for the excavated material and at least two conveyor belts for the separate return of material, of different granule or particle size into the channel.

Further objects and advantages of the invention will become apparent to persons skilled in the art from the following description of two embodiments of the irrigation installations and one embodiment of a machine for making the installation, with reference to the accompanying drawings, in which:

FIG. 1 is a diagrammatic view illustrating in cross-section an irrigation installation according to the invention;

FIG. 2 is a view taken along the line II—II in FIG. 1, the view lookng in the direction of the arrows;

FIG. 3 is a vertical sectional view on an enlarged scale of the semi-cylindrical water supply member shown in FIG. 1;

FIG. 4 is a view taken along the line IV—IV in FIG 3, the view looking in the direction of the arrows;

FIG. 5 is a view similar to FIG. 1 of a second embodiment of the invention;

FIG. 6 is a diagrammatic view disclosing in cross-section a vehicle for making the irrigation installation; and FIG. 7 is a view taken along the line VII—VII in FIG. 6, the view looking in the direction of the arrows.

The installation shown in FIGS. 1 and 2, includes channel-shaped arcuate plastic foils 2 positioned in soil 1 so that the upper edges thereof are located slightly below the maximum soil tilling depth. The foils 2 serve as water reservoirs as will later be described.

At the bottom of the foils 2, are disposed semi-cylindrical plastic water supply members 3, shown in detail in FIGS. 3 and 4. The members 3 are provided with lateral oppositely extending supporting surfaces 3a and 3b, by means of which the members rest on the foils 2. The members 3 are formed with holes 3c or perforations for the water which are inclined substantially in the direction of flow of the water as indicated by arrow 4 in FIG. 4.

The water supply members 3 as well as the lower zone of the foils 2 are covered with a filling of soil 5, the granule or particle size of which is larger than the diameter of the holes 3c. The filling 5 is covered with a layer of soil 6 having a finer granule or particle size.

The foils 2 and members 3 are so arranged that there is a slight gradient in the longitudinal direction. During operation, water flows from the water supply members 3 through the holes 3c and accumulates in the plastic foils 2. Due to capillary effects and similar phenomena, the water rises to the roots of plants 7 which are comparatively close to the reservoirs.

FIG. 5 shows diagrammatically an installation for irrigating sloping terrain. The foils 2 are arranged adjacent each other in stepped relationship so that the water can flow from the upper reservoirs 2 into the lower reservoirs in the direction indicated by arrow 8. In this manner, water supply members 3 are required only for the uppermost reservoir.

FIGS. 6 and 7 show an operating vehicle for producing the irrigation installation. The vehicle is denoted generally 9 and includes, viewing from the front towards the rear thereof, an excavating means 10, such as a bucket chain, a rotary digger, or the like, which excavates the desired channel profile, a roller 11 corresponding to the desired profile, pay-out drums or reels 12 and 13 for the plastic foil 2 and the members 3, respectively, a guide mechanism 14 for the member 3, and a retaining device 15 equipped with rollers 15a for the foil 2. In addition, the vehicle 9 carries a set of screens 16, and a conveyor 17 provided with three individual conveyor belts 17a, 17b and 17c, actuated by a common drive mechanism.

The present irrigation installation is produced by means of the vehicle 9 in the following manner:

First, the desired channel profile is excavated by means of the excavating means 10. The material removed thereby passes through the screens 16, where the coarse material 18 is separated, while material 19 having medium granule or particle size passes to the conveyor belt 17b and material 20 of fine granule or particle size to the two side belts 17a, 17c.

The roller 11 smoothes the profile of the excavated channel and conpacts the walls thereof. Into this channel is fed the plastic foils 2, and on to the foil 2 is placed the semi-cylindrical water supply member 3, whilst the guide and retaining mechanisms 14 and 15 ensuring the perfect positioning of such members.

Over the member 3, material 19 with medium granule or particle size is first applied by means of the center conveyor belt 17b, and then the channel is filled with material 20 with fine granule or particle size by conveyor belts 17a, 17c.

From the foregoing, it will be appreciated that the present invention is suitable for terrain of any gradient or slope and there is no danger of water losses due to evaporation or soaking. Moreover, the installation can be produced by relatively simple mechanism at a reasonable cost.

The plastic foils constituting the water reservoirs may be employed at the banks of water bodies such as rivers or creeks which are filled due to rain or the melting of snow, or at proper locations on mountain slopes to provide large capacity reservoirs.

The invention is not to be confined to any strict conformity to the showings in the drawings but changes and modifications may be made therein so long as such changes and modifications mark no material departure from the spirit and scope of the appended claims.

I claim:

1. An installation for irrigating arid and semi-arid soils, including an elongated arcuate imperforate flexible plastic foil positioned in a compacted excavated channel in the soil for serving as a water reservoir, said arcuate plastic foil having the concavity there of directed upwardly with upper spaced terminal edges extending axially thereof and located slightly below the maximum soil tilling depth, and a flexible perforated water supply conduit supported within the concavity by the lower portion of the arcuate plastic foil and extending axially of the foil below the plane of said edges.

2. The irrigating installation as claimed in claim 1 further including a granular filling covering the water supply conduit and at least the lower portion of the plastic foil, and the granular size of the filling being larger than the size of the perforations in the water supply conduit.

3. The irrigating installation as claimed in claim 1 in which the perforations in the water supply conduit are substantially inclined in the direction of the flow of water through the water supply conduit.

4. The irrigating installation as claimed in claim 1 in which the water supply conduit comprises a semi-cylindrical plastic member having two oppositely directed supporting surfaces for supporting the plastic member in the lower portion of the plastic foil and the perforations in the plastic member being inclined in the direction of the flow of water through the plastic member.

5. The installation as claimed in claim 1 for irrigating a gradient, in which arcuate foils are arranged perpendicularly to the gradient in stepped relationship adjacent to one another along the gradient.

6. A mobile vehicle for producing an installation for irrigating arid and semi-arid soils by means of an arcuate imperforate plastic foil having a flexible perforated water supply conduit positioned in the lower portion of the plastic foil, comprising a vehicle body provided with excavating means from the front to the rear thereof for excavating the desired channel, a roller corresponding to the profile of the channel for compacting the channel, a first drum carrying a plastic foil for laying the foil in the channel following compacting thereof by the roller, a second drum carrying a flexible perforated water supply conduit for positioning the conduit on the laid plastic foil, guide and retaining means cooperable with the plastic foil and water supply conduit, a set of screens for screening the excavated soil and at least two conveyor belts for the separate return of soil possessing different granule size into the channel.

References Cited by the Examiner

UNITED STATES PATENTS

| | | | |
|---|---|---|---|
| 668,362 | 2/1901 | Tomlinson | 61—13 |
| 966,069 | 8/1910 | Austin | 61—13 |
| 1,401,386 | 12/1921 | Woodberry | 61—13 |
| 1,750,054 | 3/1930 | Rosso | 61—72.6 X |
| 2,763,991 | 9/1956 | Kennon | 61—13 |
| 2,783,698 | 3/1957 | Bambi. | |
| 2,795,542 | 6/1957 | Horne et al. | 61—13 |
| 2,916,854 | 12/1959 | Heigl et al. | |
| 3,203,188 | 8/1965 | Evans | 61—72.6 |

FOREIGN PATENTS

| | | |
|---|---|---|
| 792,799 | 10/1935 | France. |
| 938,850 | 2/1956 | Germany. |

OTHER REFERENCES

"Low Cost Subsurface Drainage," Charles Bush; Agricultral Engineering; February 1958, pp. 92, 93, 97 and 103.

EARL J. WITMER, *Primary Examiner.*